Dec. 2, 1924.
E. A. NORBERG
COLLAPSIBLE SLED
Filed Feb. 9, 1922
1,517,379
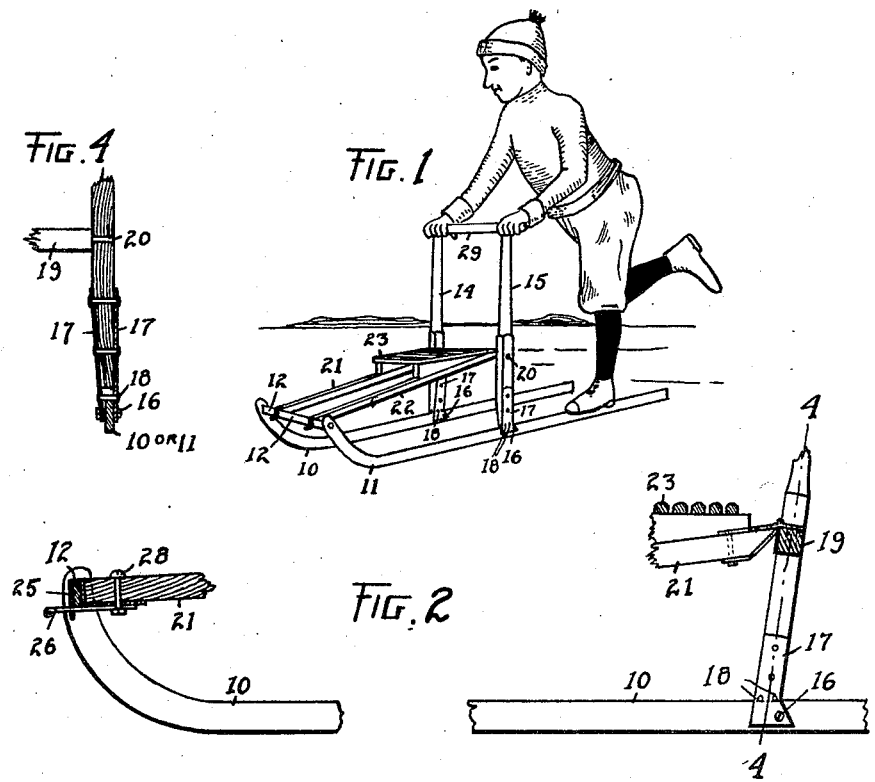
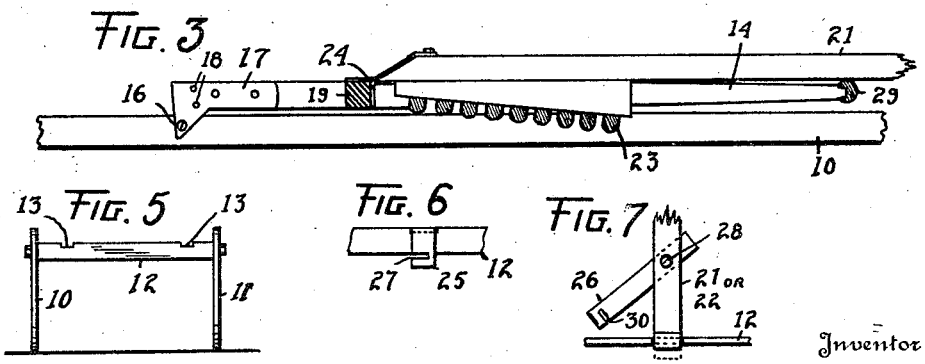

Patented Dec. 2, 1924.

1,517,379

UNITED STATES PATENT OFFICE.

EDMUND A. NORBERG, OF JAMESTOWN, NEW YORK.

COLLAPSIBLE SLED.

Application filed February 9, 1922. Serial No. 535,134.

*To all whom it may concern:*

Be it known that I, EDMUND A. NORBERG, a citizen of the United States, residing at the city of Jamestown, in the county of Chautauqua and State of New York, have invented certain new and useful Improvements in Collapsible Sleds, of which the following, taken in connection with the accompanying drawings, is a specification.

The invention relates to sleds of the stepper or foot driven type; and the object of the improvement is to provide a sled of said type with seat supporting frame, and raised hand bar arranged for collapsing by simply unlatching the seat supports from the front cross bar and folding the seat and combination back rest and hand frame upon the runners so that the collapsed frame may be carried upon the arm or suspended on said front cross bar; and the invention consists in the novel features and combinations hereinafter set forth and claimed.

In the drawings, Figure 1 is a perspective view of the complete sled in use with a boy propelling the same. Fig. 2 is a lengthwise sectional view of a portion of one of the seat support bars, showing the latch for the front end of the same upon the front cross bar which is also in section, and the seat and the supporting bar for the rear end of the seat supporting bars, the central and rear portions being broken away. Fig. 3 is a similar lengthwise sectional view of the collapsible sled in the folded position, the front and rear ends being broken away. Fig. 4 is a lengthwise sectional view at line 4—4 in Fig. 2, showing the preferred manner of attachment of the two uprights of the hand frame to the runners, the upright being shown in section and showing the pin or pivotal support of the seat bar in the upright. Fig. 5 is a front elevation of the sled showing the front cross bar with the locking notches therein. Fig. 6 is an elevation of a portion of said cross bar with the latching end of one of the seat support bars engaging over said cross bar in one of said locking notches, the latch not being in place; and Fig. 7 is a top plan view of the same showing the latch plate turned to one side.

Like characters of reference refer to corresponding parts in the several views.

The numeral 10 designates one runner, and the numeral 11, the other. The runners 10 and 11 are connected at their front ends by the cross bar 12 which has the spaced locking or latching notches 13 therein, said cross bar being preferably non-rotatively attached to the preferable spring steel runners 10 at each end.

The runners 10 and 11 are further connected by means of the seat supporting frame and hand or pusher rail and back rest which is composed of the uprights 14 and 15 each pivotally attached at 16 to the runners 10 and 11. The lower end of each of the uprights 14 and 15 preferably has the similar metal plates 17 attached on the opposite sides of their lower ends to receive the pivoting or hinging screw bolt 16 for pivotally attaching said lower ends through the runner 10 or 11 and said plates 17. A pair of bolts or rivets 18 are provided just above the runner 10 or 11 to rest thereon when in the set-up position.

The uprights 14 and 15 are further connected by the seat support cross bar 19 which is attached to the uprights 14 and 15 by means of a pivot or hinging pin 20 so that said seat support bar 19 can be turned when collapsing the sled frame. The seat support bar 19 is connected to the front cross bar 12 by means of two spaced seat support bars 21 and 22 which are connected by the seat 23 thereon.

The seat support bars 21 and 22 are hinged at 24 to the cross bar 19 at their rear ends, and at their front ends are latched over the front cross bar 12 by means of the latch pieces 25 and 26, the latch piece 25 having the open-ended slot 27 to receive the latch 26 therein. The latch 26 is pivotally attached to the latch piece 25 and seat support bar 21 or 22 by means of the pivot bolt 28.

The uprights 14 and 15 are connected at their upper ends by the crosswise hand bar 29. The runners 10 and 11 extend rearward for some distance beyond the points of attachment for the uprights 14 and 15 so that said runners may support the user as he propels the sled with one foot while he stands on the other runner; or the feet may be placed one upon one runner and the other upon the other, said spring steel runners 10 and 11 being bendable to permit the turning of the sled in either direction to guide the same. Said guiding of the sled is rendered especially easy by placing one foot near the rear end of one runner and the other foot on the other runner farther forward so that a bracing twist may be given to said runners, turning easily in either direction as desired.

It is apparent that all that is necessary to collapse or fold the sled is to unlatch the latch pieces 26 from the slots 27, thereby permitting said support bars 21 and 22 to be folded backward onto the frame uprights 14 and 15 and hand bar 29, folding said seat and hand support or pusher frame back onto the rear end portions of the runners, as shown in Fig. 3, thereby permitting the sled to be supported or suspended by the front cross bar which is preferably of steel in order to be strong and of light weight. The user may hang the folded sled on his shoulder by said cross bar 12 in order to carry the sled, or it may be hung out of the way by means of said cross bar, as for example under his outer coat or hat in the coat room at school.

What is claimed as new is:

1. A sled of the class described comprising metal runners having upturned front ends connected by a rigid metal cross bar, uprights hinged at their lower ends to said runners and having a hand bar connection at their upper ends and a cross bar attached to said uprights a spaced distance from said lower ends, seat support bars one to each side hinged to said cross bar in said uprights at their rear ends and removably latching around said rigid cross bar at their front ends, and a seat on said seat support bars.

2. A sled of the class described comprising spring steel runners having upturned front ends connected by a cross bar, said cross bar having spaced notches therein, a seat supporting frame consisting of uprights pivotally attached to said spring runners at each side to fold rearwardly, a cross bar at the desired height for the seat attached to said uprights, a hand rail connecting the upper ends of said uprights, spaced seat supporting bars hinged to said second named cross bar at their rear ends, slotted latch pieces on the forward ends of said seat supporting bars fitting over said front cross bar in said notches, and slotted latches pivotally attached one to each of said latch pieces and seat support bars to engage an open-ended slot in each of said latch pieces and bind said latch pieces around said front cross bar to releasably attach the same.

In testimony whereof I have affixed my signature in the presence of two witnesses.

EDMUND A. NORBERG.

Witnesses:
CORINNE V. SWANSON,
THEO. THOMAS HAAG.